(12) United States Patent
Itou

(10) Patent No.: US 10,346,711 B2
(45) Date of Patent: Jul. 9, 2019

(54) IMAGE CORRECTION DEVICE, IMAGE CORRECTION METHOD, AND IMAGE CORRECTION PROGRAM

(71) Applicant: JVC KENWOOD Corporation, Yokohama-shi, Kanagawa (JP)

(72) Inventor: Tamotsu Itou, Yokohama (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 145 days.

(21) Appl. No.: 15/671,047

(22) Filed: Aug. 7, 2017

(65) Prior Publication Data

US 2017/0337446 A1 Nov. 23, 2017

Related U.S. Application Data

(63) Continuation of application No. PCT/JP2015/083159, filed on Nov. 26, 2015.

(30) Foreign Application Priority Data

Mar. 23, 2015 (JP) ................................ 2015-059736

(51) Int. Cl.
*H04N 1/60* (2006.01)
*H04N 9/69* (2006.01)
(Continued)

(52) U.S. Cl.
CPC ....... *G06K 9/4652* (2013.01); *G06K 15/1878* (2013.01); *G06T 5/007* (2013.01); *G06T 5/008* (2013.01); *G06T 7/11* (2017.01); *G06T 7/90* (2017.01); *G06T 11/001* (2013.01); *G09G 5/028* (2013.01); *G09G 5/377* (2013.01); *H04N 9/69* (2013.01); *G06T 2207/10024* (2013.01);
(Continued)

(58) Field of Classification Search
CPC ............ G06T 7/90; G06T 2207/30004; G09G 3/2003; G09G 5/028; G09G 5/377; G09G 2320/0276; G09G 2320/0673; G09G 2320/0686; G09G 2380/08; H04N 1/56; H04N 1/40012; H04N 1/6005; H04N 5/202
See application file for complete search history.

(56) References Cited

U.S. PATENT DOCUMENTS 7,084,881 B1 * 8/2006 Chen ..................... G06T 11/001
345/589
2002/0173721 A1 * 11/2002 Grunwald ................ A61B 8/00
600/437
(Continued)

FOREIGN PATENT DOCUMENTS

JP 2013232881 A 11/2013

*Primary Examiner* — Michael J Eurice
(74) *Attorney, Agent, or Firm* — Brundidge & Stanger, P.C.

(57) ABSTRACT

A color gamma processing unit subjects an input image to gamma correction for color on a pixel by pixel basis. A GSDF processing unit subjects the input image to gamma correction for monochrome on a pixel by pixel basis. A mixer mixes a gamma corrected value for color provided by the color gamma processing unit with a gamma corrected value for monochrome provided by the GSDF processing unit at a mixing ratio based on a pixel-by-pixel saturation value of the input image, and outputs a gamma corrected value of a pixel in the input image.

6 Claims, 7 Drawing Sheets

(51) Int. Cl.
*G06K 9/46* (2006.01)
*G06T 7/11* (2017.01)
*G06T 7/90* (2017.01)
*G06K 15/02* (2006.01)
*G06T 5/00* (2006.01)
*G06T 11/00* (2006.01)
*G09G 5/02* (2006.01)
*G09G 5/377* (2006.01)
*G09G 3/20* (2006.01)
*H04N 1/56* (2006.01)
*H04N 1/40* (2006.01)
*H04N 5/202* (2006.01)

(52) U.S. Cl.
CPC .. *G06T 2207/30004* (2013.01); *G09G 3/2003* (2013.01); *G09G 2320/0276* (2013.01); *G09G 2320/0646* (2013.01); *G09G 2320/0673* (2013.01); *G09G 2320/0686* (2013.01); *G09G 2380/08* (2013.01); *H04N 1/40012* (2013.01); *H04N 1/56* (2013.01); *H04N 1/60* (2013.01); *H04N 1/6005* (2013.01); *H04N 5/202* (2013.01)

(56) References Cited

U.S. PATENT DOCUMENTS

| | | | |
|---|---|---|---|
| 2003/0068081 A1* | 4/2003 | Jia | G06T 11/001 382/162 |
| 2006/0153429 A1* | 7/2006 | Gehlen | G06K 9/00228 382/118 |
| 2006/0187246 A1* | 8/2006 | Miyagi | H04N 1/233 347/5 |
| 2006/0250412 A1* | 11/2006 | Chen | G06T 11/001 345/589 |
| 2006/0290957 A1* | 12/2006 | Kim | H04N 1/4072 358/1.9 |
| 2007/0127094 A1* | 6/2007 | Kawamoto | H04N 1/00132 358/518 |
| 2007/0216777 A1* | 9/2007 | Quan | G06K 9/34 348/222.1 |
| 2009/0105544 A1* | 4/2009 | Takahira | A61B 1/00188 600/178 |
| 2009/0122073 A1* | 5/2009 | Higgins | G09G 3/2003 345/590 |
| 2009/0213396 A1* | 8/2009 | Togami | H04N 1/3875 358/1.9 |
| 2010/0079779 A1* | 4/2010 | Kuno | H04N 1/6027 358/1.9 |
| 2010/0309315 A1* | 12/2010 | Hogasten | H04N 5/33 348/164 |
| 2012/0299967 A1* | 11/2012 | Urabe | G09G 5/14 345/660 |
| 2013/0136344 A1* | 5/2013 | Obrecht | H04N 1/40012 382/162 |
| 2013/0259364 A1* | 10/2013 | Shindo | G06K 9/4652 382/164 |
| 2013/0259365 A1* | 10/2013 | Suzuki | G06K 9/4652 382/164 |
| 2014/0355013 A1* | 12/2014 | Voss | H04N 1/624 358/1.9 |
| 2015/0055025 A1* | 2/2015 | Gotoh | G09G 3/3426 348/790 |
| 2015/0091950 A1* | 4/2015 | Park | G09G 3/3291 345/690 |
| 2016/0225323 A1* | 8/2016 | Lu | G09G 3/3406 |
| 2016/0225344 A1* | 8/2016 | Joo | G09G 5/10 |
| 2017/0018231 A1* | 1/2017 | Liu | G09G 3/3688 |

* cited by examiner

FIG. 2

| JND | L [ cd/m² ] |
|---|---|
| 1 | 0.0500 |
| 2 | 0.0547 |
| 3 | 0.0594 |
| 4 | 0.0643 |
| ⋮ | ⋮ |
| 315 | 27.1025 |
| ⋮ | ⋮ |
| 629 | 298.9195 |
| 630 | 300.9770 |
| ⋮ | ⋮ |
| 1022 | 3967.547 |
| 1023 | 3993.404 |

IMAGE CORRECTION DEVICE, IMAGE CORRECTION METHOD, AND IMAGE CORRECTION PROGRAM

BACKGROUND OF THE INVENTION

1. Field of the Invention

The present invention relates to image correction technology and, more particularly, to gamma correction technologies for images.

2. Description of the Related Art

Monochrome images should be corrected by DICOMGSDF before being displayed on a medical display. DICOMGSDF denotes a Grayscale Standard Display Function (GSDF) defined in the Digital Imaging and Communication in Medicine (DICOM). GSDF is a standard function for displaying grayscale images ergonomically designed to suit the sensitivity of human eyes to brightness.

When color images that should be gamma corrected with γ=2.2 for display is corrected by GSDF for display, the images may not be displayed properly. In particular, saturation decrease and hue shifts will be prominent because GSDF characteristically results in less brightness in low-bit images.

This is addressed in the related art by discriminating between color areas and monochrome areas in an image and selecting a gamma curve for the respective areas, i.e., performing 2.2 gamma correction in the color areas and correcting the monochrome areas by GSDF. For example, Patent Document 1 discloses a method of segmenting an image into color areas and monochrome areas.

Patent Document 1 JP2013-232881

If an image is segmented clearly into color areas and monochrome areas, it is possible to discriminate between areas. In the case of a complicated layout including color images and monochrome images, it is difficult to discriminate between areas. For example, it is difficult to discriminate between areas if a plurality of windows overlap each other in an image or if a color thumbnail image is included in a monochrome image. In the event of an erroneous determination, an unnatural step may be created at a boundary between areas.

SUMMARY OF THE INVENTION

The present invention addresses the issue and a purpose thereof is to provide an image correction technology whereby an unnatural step is unlikely to occur at a boundary between a color image area and a monochrome image area.

To address the aforementioned issue, an image correction device according to an embodiment comprises: a color gamma processing unit that subjects an input image to gamma correction for color on a pixel by pixel basis; a monochrome gamma processing unit that subjects the input image to gamma correction for monochrome on a pixel by pixel basis; and a mixer that mixes a gamma corrected value for color provided by the color gamma processing unit with a gamma corrected value for monochrome provided by the monochrome gamma processing unit at a mixing ratio based on a pixel-by-pixel saturation value of the input image, and outputs a gamma corrected value of a pixel in the input image.

Another mode of the embodiment relates to an image correction method. The method comprises: subjecting an input image to gamma correction for color on a pixel by pixel basis; subjecting the input image to gamma correction for monochrome on a pixel by pixel basis; and mixing a gamma corrected value for color provided by said gamma correction for color with a gamma corrected value for monochrome provided by said gamma correction for monochrome at a mixing ratio based on a pixel-by-pixel saturation value of the input image, and outputs a gamma corrected value of a pixel in the input image.

Optional combinations of the aforementioned constituting elements, and implementations of the invention in the form of methods, apparatuses, systems, recording mediums, and computer programs may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 2 shows a JND index;

DETAILED DESCRIPTION OF THE INVENTION

The invention will now be described by reference to the preferred embodiments. This does not intend to limit the scope of the present invention, but to exemplify the invention.

Figure 1:
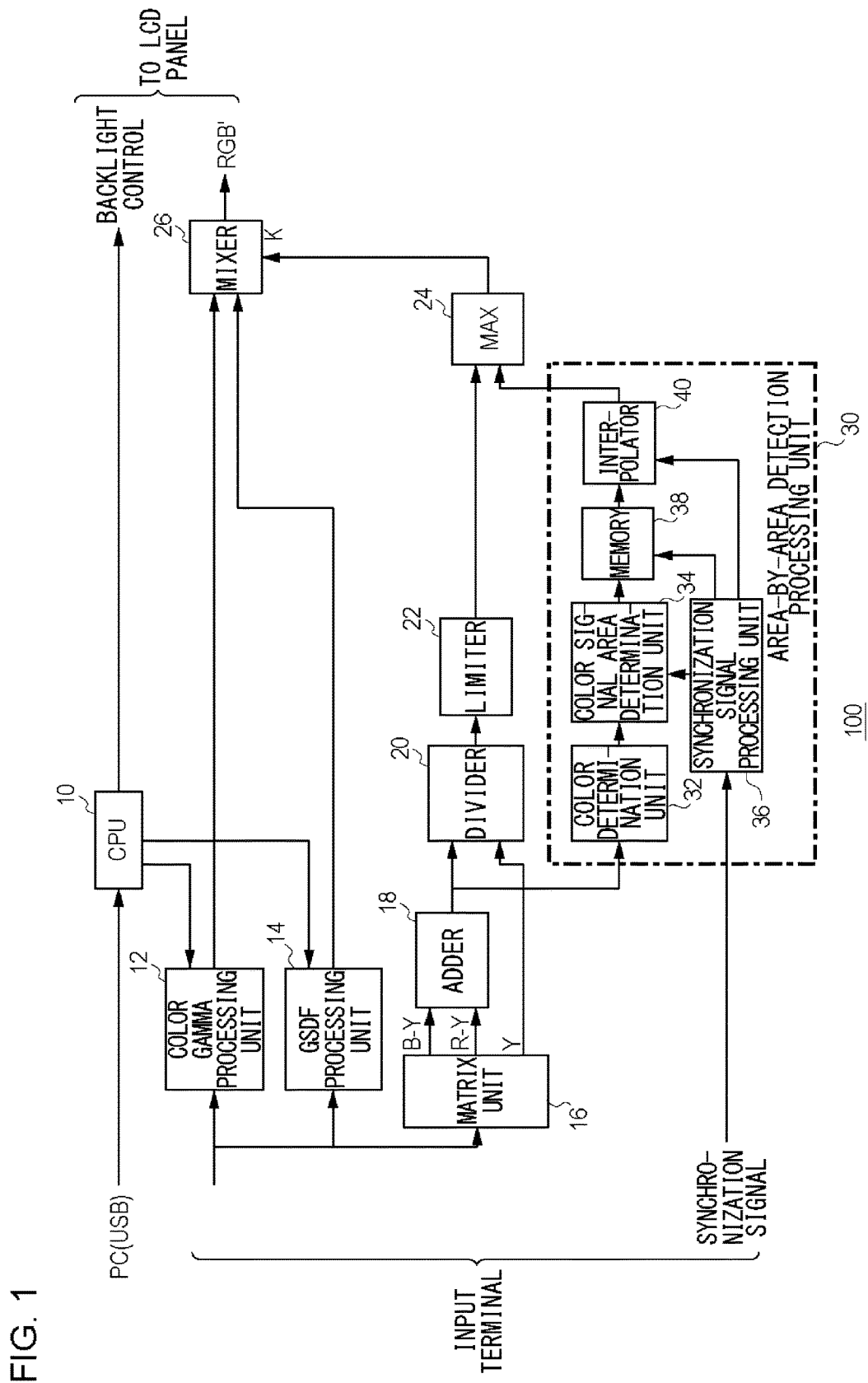
FIG. 1 shows features of an image correction device according to an embodiment.

FIG. 1 shows features of an image correction device 100 according to an embodiment. The features illustrated in the figure can be implemented by hardware, software, or a combination thereof.

A CPU 10 sets data in a look-up table (LUT) used in a color gamma processing unit and a GSDF processing unit. The CPU 10 also has the function of adjusting the brightness of the backlight to a brightness designated by the user. The LUT data and brightness setting are provided from a personal computer (PC) via an external interface like a USB and stored in a memory such as an EEPROM (not shown).

The color gamma processing unit 12 subjects an input RGB image signal to gamma correction of γ=2.2. This is a signal process of computation to ensure that a panel output is equal to an input signal raised to a power of 2.2. In the case of an ideal panel profile where an input and an output are identical, the input signal is raised to a power of 2.2. In practice, the panel profile is non-linear so that the input signal is converted based on a LUT obtained by measuring the panel profile.

An exemplary implementation of 2.2 gamma process will be described in specific details. Equal values of 0 to 1023 are entered in RGB. The brightness value measured on the display panel when the RGB values of 1023 are entered is used as a reference. An LUT of the display, which maps brightness values at RGB values less than 1023 to input signals such that the brightness value is proportional to a 2.2 power of the input signal, is stored. The LUT is set in the display manufacturing step or set in the PC of the user. In a 2.2 gamma process, output signals raised to a 2.2 power are obtained by converting the input signal based on the LUT. According to the embodiment, the LUT is configured as an SRAM (not shown), which is a volatile memory. Therefore, the data stored in the EEPROM is written by the CPU when the device is turned on. Generally, color images are recorded with a 1/2.2 power gamma profile at imaging. By combining the feature with 2.2 power gamma of the display, an original linear profile is realized.

The GSDF processing unit 14 corrects the input RGB image signal by GSDF. GSDF is a signal process that makes the profile of the input signal and the panel output as numerically defined in DICOMGSDF. In medical monitors, a target maximum brightness is generally set first, and the input/output profile is determined from a Just Noticeable Difference (JND; "minimum difference threshold" or "brightness difference threshold") index corresponding to the maximum target brightness. As in the case of color gamma process, the panel profile is non-linear so that the input signal is subject to conversion based on an LUT obtained by measuring the panel profile.

FIG. 2 shows a JND index. A JND index is a correspondence chart that maps index values to brightness values.

An example of implementation of GSDF will be described in further specific details. In a GSDF process, brightness values are mapped to values (JND values) defined in DICOMpart14 and determined according to the maximum brightness value. The maximum RGB values of 1023 are input and the brightness of the panel is measured. The backlight is adjusted to result in the target maximum brightness. Subsequently, an LUT of the display, which maps brightness values measured at input signals of values less than 1023 to input signals such that the measured brightness is proportional to the JND value determined by the maximum brightness, is stored. The LUT is set in the display manufacturing step or set in a PC of the user. In a GSDF process, the output signal having the GSDF profile is obtained by converting the input signal based on the LUT. The data in the LUT is set when the device is turned on by the CPU, as in the case of color gamma process.

For example, given the maximum brightness of 300 cd/m$^2$, the table of FIG. 2 (JND index) defines that the maximum JND value is 630. If the input IN is in 10 bits, the JND value at each gray level is given by 630*(IN/1023). In the case of IN=512, for example, the corresponding JND value will be 630*512/1023=315. The table of FIG. 2 shows that the brightness value in this case is 27.1 cd/m$^2$. In the case of a monochrome signal, a signal source (PC) supplies a linear profile and the GSDF profile is realized on the display side.

Reference is made back FIG. 1. A mixer 26 mixes a 2.2 gamma output value D1 from the color gamma processing unit 12 with a GSDF output value D2 from the GSDF processing unit 14 (these output values are all given in the form of RGB values) in accordance with a saturation value K output from a limiter 22. If the saturation value K is 0, the GSDF output value D2 is selected 100%. If saturation value K is the upper limit (512 in the case of the embodiment), the 2.2 gamma output value D1 is selected 100%. If the saturation is of a value K right in the middle (256 in the case of the embodiment), the mixing ratio of the 2.2 gamma output value D1 and the GSDF output value D2 is 50%:50%. In general, the mixing ratio of the 2.2 gamma output value D1 and the GSDF output value D2 is given by K/512:(512−K)/512.

It should however be noted that, where the saturation value of a pixel from the limiter 22 and the area-by-area detected saturation value from the area-by-area detection processing unit 30 are combined, the larger of the saturation value from the limiter 22 and the area-by-area detected saturation value from the area-by-area detection processing unit 30 is selected by a maximum value selector 24 and used as the saturation value K.

The output OUT of the mixer 26, occurring when the input values D1, D2 and the saturation value K with a maximum value of 512 are input, is given by the following expression.

$$OUT=(K*D1+(512-K)*D2)/512$$

where D1 denotes a 2.2 gamma output value, D2 denotes a GSDF output value, and K denotes a saturation value.

A matrix unit 16 converts an RGB signal into a brightness signal (Y) and color-difference signals (R-Y, B-Y). For conformity to ITU-RBT.709, the brightness signal Y is converted from the RGB value according to the following expression.

$$Y=0.2126R+0.7152g+0.0722B$$

Meanwhile, the color-difference signals B-Y, R-Y are obtained by subtracting the brightness signal Y from B and R, respectively.

An adder 18 adds the two color difference signals R-Y, B-Y to obtain the saturation signal. The color-difference signals may have negative values and so are turned into absolute values before being added.

A divider 20 obtains a normalized saturation signal by dividing a value D3 of the saturation signal obtained in the adder 18 by a value D4 of the brightness signal Y obtained in the matrix unit 16. If the input RGB values are large, the value of the saturation signal obtained in the adder 18 will be large accordingly. Therefore, a given color intensity is detected differently in a dark image and in a bright image. This is addressed by dividing the saturation signal value by the brightness signal value so that a determination on the saturation does not depend on the level of the input signal. Because the result of division is fractional, the result of division is turned into an integer by multiplying it by, for example, a factor such as 4096. In the case of a factor 4096, the output value OUT from the divider 20 is given by the following expression.

$$OUT=4096*D3/D4$$

where D3 denotes the saturation signal value obtained by adding the absolute values of the two color-difference signals in the adder 18 and D4 denotes the brightness signal value Y obtained in the matrix unit 16.

The limiter 22 limits the normalized saturation signal to a certain level. The limit value (upper limit value) is the value occurring when the mixing ratio in the mixer 26 is such that the 2.2 gamma output is selected 100%. In this embodiment, the limit value is 512. For example, if the input is 12 bit and takes a value from 0 to 4095 and the limiter 22 clips 513 or higher and output only 512 or lower, the relationship between the input value IN and the output value OUT will be as follows.

if (IN<=512)OUT=IN else OUT=512

The area-by-area detection processing unit 30 makes a color/monochrome determination on an area by area basis and outputs area-by-area detected saturation values. The area-by-area detection processing unit 30 includes a color determination unit 32, a color signal area determination unit 34, a synchronization signal processing unit 36, a memory 38, and an interpolator 40.

The color determination unit 32 outputs 1 (true) if the input saturation signal is higher than a threshold value and outputs 0 (false) otherwise.

The color signal area determination unit 34 stores a result of counting the determination result of the color determination unit 32 in a memory 38 provided for each fixed area including 32 horizontal pixels and 32 vertical lines according to the embodiment. The counted value represents the magnitude of proportion of color signals (referred to as "area-by-area detected saturation value") in the fixed area.

As described above, the memory 38 stores, for each fixed area, the counted value used in the color signal area determination unit 34.

The synchronization signal processing unit 36 identifies the position of the area, determines a start point and an end point for the color signal area determination unit 34, generates an address in the memory corresponding to the area, and performs a read and write process accordingly. Further, the synchronization signal processing unit 36 generates a synchronization signal for determining x coordinates and y coordinates of pixels used in an interpolator 40.

If the output of the color signal area determination unit 34 is used directly, a step is created between areas. Therefore, the interpolator 40 performs an interpolation process between two adjacent areas. The interpolation process is exemplified by a linear interpolation process performed by changing the mixing ratio linearly in accordance with the distance from the center of the area. The interpolation process is performed both horizontally and vertically.

A maximum value (MAX) selector 24 identifies the magnitude relationship between a pixel saturation signal from the limiter 22 and an area saturation signal subjected to the interpolation process in the interpolator 40 of the area-by-area detection processing unit 30. The maximum value selector 24 outputs the larger of the two signals. The output value of the maximum value selector 24 is input to the mixer 26 as the saturation value K and is used to calculate the mixing ratio of mixing the 2.2 gamma output value and the GSDF output value.

Described above is the features of the image correction device 100 including the area-by-area detection processing unit 30. Alternatively, the area-by-area detection processing unit 30 may be optional. The area-by-area detection processing unit 30 may be omitted and the saturation signal of the pixel from the limiter 22 may be directly used as the saturation value K input to the mixer 26.

A description will be given of the flow of a signal process performed by the image correction device 100 having the above features.

The color gamma process in the color gamma processing unit 12 and the GSDF process in the GSDF processing unit 14 are performed in parallel. The pixel-by-pixel saturation determination process in the divider 20 and the limiter 22 and the area-by-area saturation determination process in the area-by-area detection processing unit 30 are performed in parallel.

An RGB signal and a synchronization signal are input via the input terminal. The data for R, G, and B of the RGB signal is input to the color gamma processing unit 12 and the GSDF processing unit 14 so as to be subject to the color gamma process and the GSDF process. The result of these processes are input to the mixer 26.

The RGB signal is also input to the matrix unit 16 and is converted into the color-difference signals R-Y, B-Y and the brightness signal Y.

The two color difference signals R-Y, B-Y are turned into absolute values before being added by the adder 18. The added result is input to the divider 20 as a numerator D3 of the division in the divider 20. The brightness signal Y is input to the divider 20 as a denominator D4 of the division in the divider 20. The output D3/D4 of the divider 20 represents the saturation signal for each pixel.

The saturation signal for each pixel is limited by the limiter 22 so that the maximum value is limited to, for example, 512. The output from the limiter 22 is input to the maximum value selector 24. The limit value (upper limit value) 512 is the value occurring when a gamma processed input signal A is mixed in the mixer 26 with a mixing ratio of 100%.

Meanwhile, the output D3 of the adder 18 is also supplied to the color determination unit 32 of the area-by-area detection processing unit 30. The area-by-area detected saturation signal output from the interpolator 40 of the area-by-area detection processing unit 30 is also input to the maximum value selector 24. The maximum value selector 24 selects the larger of the pixel-by-pixel saturation signal and the area-by-area saturation signal and feeds the selected signal to the mixer 26 as a mixing ratio K. The mixer 26 mixes the color gamma processed signal and the GSDF processed signal (monochrome signal) at a ratio commensurate with the mixing ratio K and supplies the post-mixture RGB signal, i.e., RGB', to the LCD panel. A backlight control signal from the CPU 10 is also supplied to the LCD panel.

A detailed description will now be given of the area-by-area detection process performed by the area-by-area detection processing unit 30.

A description will be given of the flow of a signal process for area-by-area detection. In general, video signal data for one horizontal period is input in a horizontal sequence. A horizontal blanking or a horizontal synchronization signal provides an interval, followed by an image signal for the next vertical position. The process is repeated as determined by the number of effective lines.

The horizontal and vertical positional information is produced in the synchronization signal processing unit 36 based on the input of a synchronization signal. The color signal area determination unit 34 cumulatively adds the result of area-by-area color determination based on the positional information produced by the synchronization signal processing unit 36.

Figure 3:
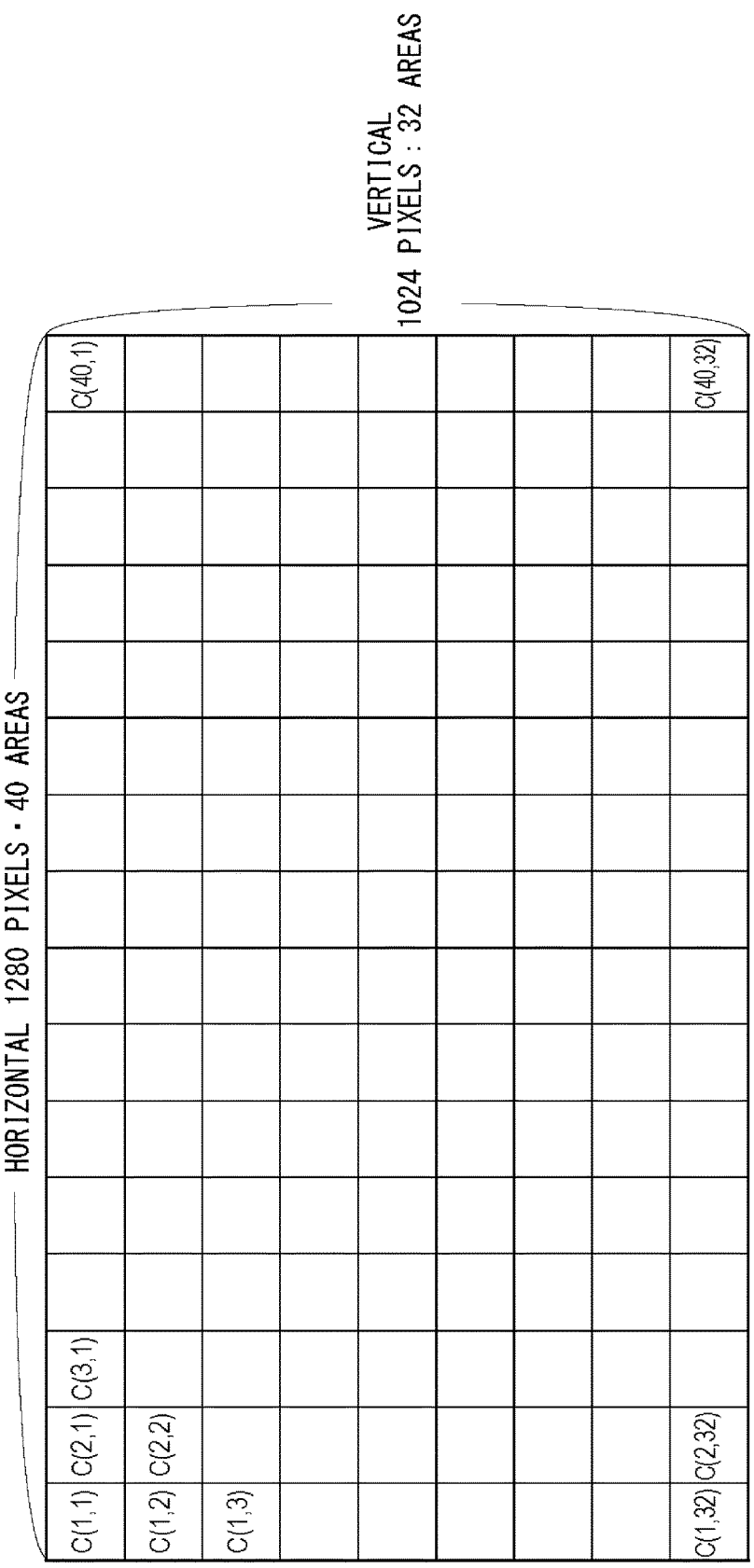
FIG. 3 shows areas in an image.

FIG. 3 shows areas in an image. In the embodiment, one area is formed by 32 horizontal pixels and 32 vertical lines. The total number of pixels in the horizontal direction is 1280, the total number of lines in the vertical direction is 1024, and the image is divided into 40 areas horizontally and 32 areas vertically.

In the first line of an area, the color determination result for 32 pixels in the area is counted. When the last pixel in the horizontal area is reached, the count is written in a memory assigned to the area. The count of the color determination result detected in the next area is similarly written in a memory. If the color determination result is true in 10 of the pixels in the area, the counted value will be 10.

In the second and subsequent lines in the area, the data recorded in the previous line is read from the memory assigned to the area, the count detected in the current line is added, and the sum is written in the memory again. The count up to the final pixel on the 32th line, i.e., the last line, of the area, represents the color determination result for the area.

The area in the next column is then subject to signal determination. A memory corresponding to the area is used similarly. Ultimately, color determination results for a total of 1280 areas are obtained.

Figure 4:
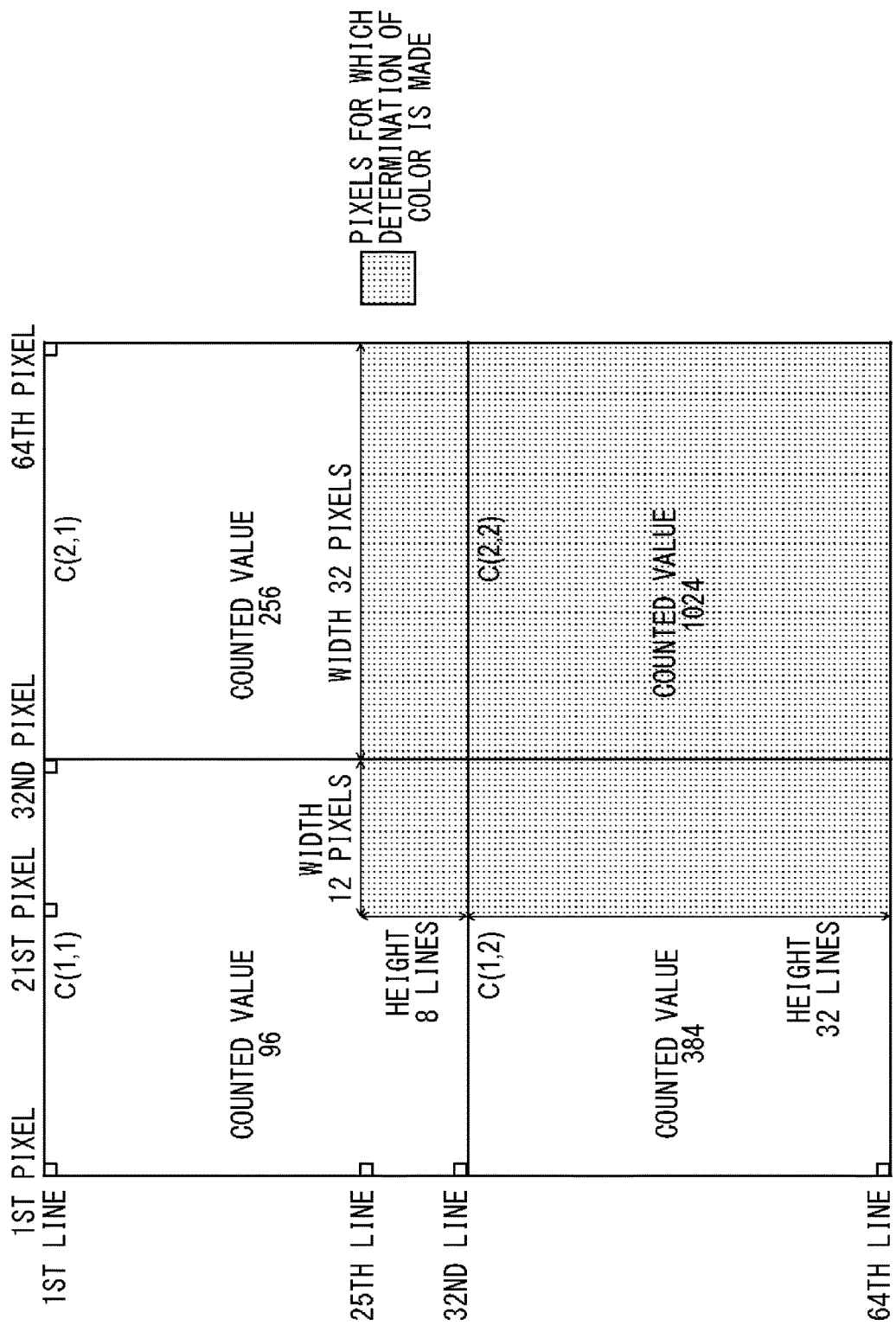
FIG. 4 shows an example of color determination results in an area.

FIG. 4 shows an example of color determination result in an area. For example, if it is given that the color determination unit 32 yields a true determination to the right of and below the pixel at the 21st position horizontally and on the 25th line vertically in an area formed by 1st to 32th pixels horizontally and 1st to 32th lines vertically, a true determination is made in a total of 12(pixels)×8(lines)=96 pixels and the counted value is used as the data for the area-by-area detected saturation value C(1,1). Similarly, C(1,2)=384 in the area immediately below, C(2,1)=256 in the area to the right, and C(2,2)=1024 in the area to the lower right.

The area-by-area detected saturation value for one frame obtained in the above process is read in the next video frame.

If the area-by-area detected saturation value C detected in each area is used as the saturation value for the pixels in the area, an unnatural step may be produced at a boundary to the adjacent area. This is addressed by determining the saturation value of the pixels in the area by leveling whereby the area-by-area detected saturation value of the area is combined with the area-by-area detected saturation value for the adjacent area for interpolation. For the purpose of interpolation for the first area horizontally and vertically, the data for the area-by-area detected saturation value C(1,1) detected in the area in the immediately previous frame, the area-by-area detected saturation value C(1,2) of the area immediately below, the area-by-area detected saturation value C(2,1) to the right, and the area-by-area detected saturation value C(2,2) to the lower right are used. It is noted that x in C(x,y) denotes a horizontal area number, y denotes a vertical area number.

The point in the area positioned x-th horizontally and y-th vertically at a horizontal distance h and a vertical distance v will be denoted by P(x,y) (h,v). The post-interpolation area-by-area detected saturation value at the point P is defined as H(x,y) (h,v).

Defining the center of the area as the origin and adding the four area-by-area detected saturation values C in accordance with the horizontal distance h and the vertical distance v, the post-interpolation area-by-area detected saturation value H(1,1) (h,v) is obtained.

$$H(1,1)(h,v)=((C(1,1)*(32-h)+C(1,2)*h)*(32-v)+(C(2,1)*(32-h)+C(2,2)*h)*v)/1024$$

In the areas at the top, bottom, left end, and right end of the screen, interpolation data outward of the middle point is not available so that the calculation is performed by assuming that h=0 or v=0.

Figure 5:
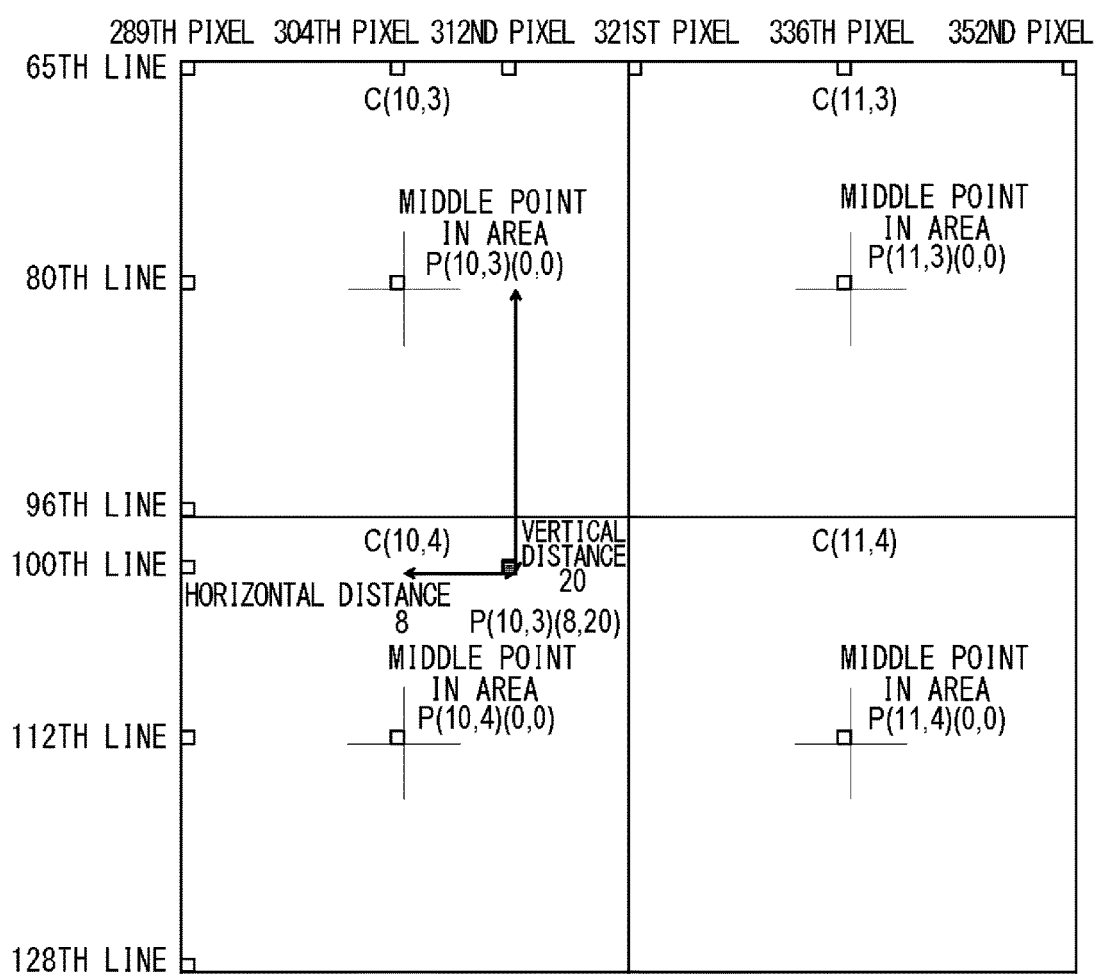
FIG. 5 shows a horizontal distance and a vertical distance of a pixel relative to the center of an area.
Figure 6:
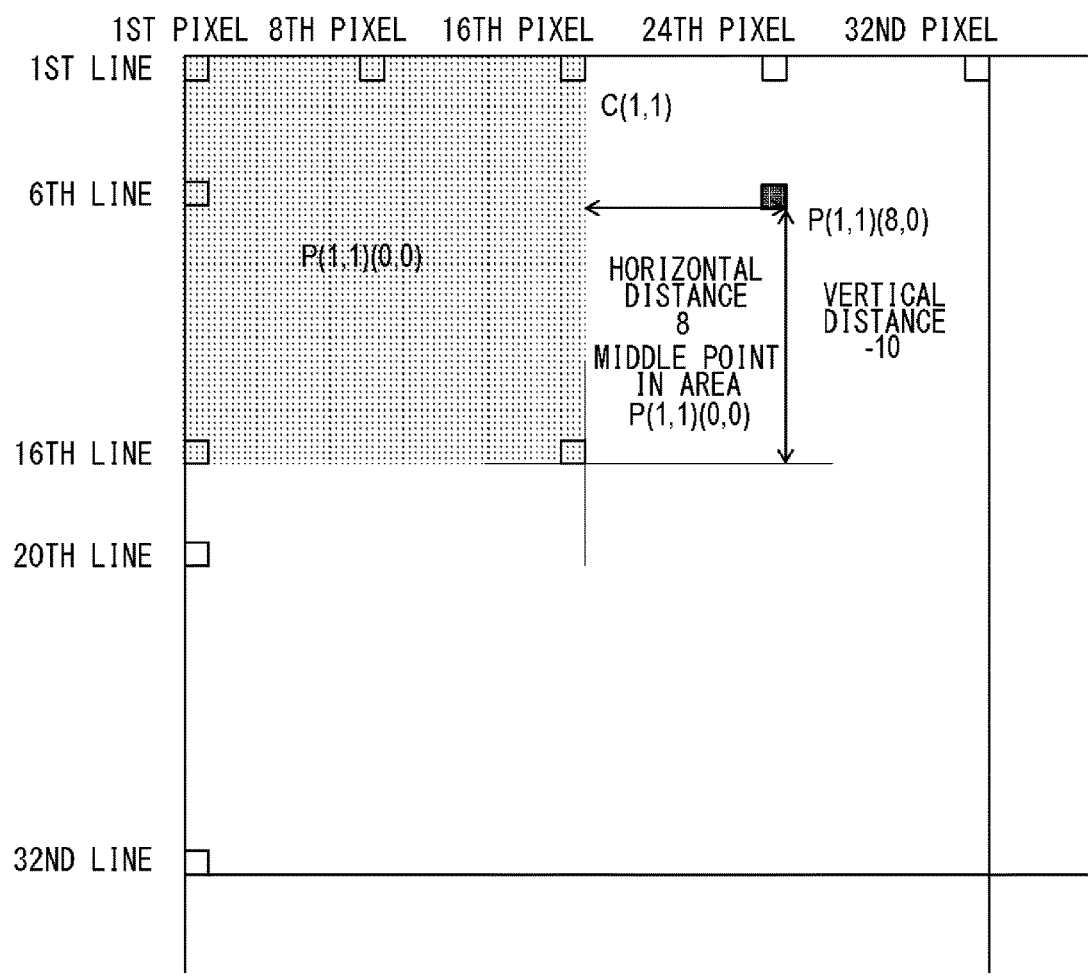
FIG. 6 shows a horizontal distance and a vertical distance of a pixel relative to the center of an area.
Figure 7:
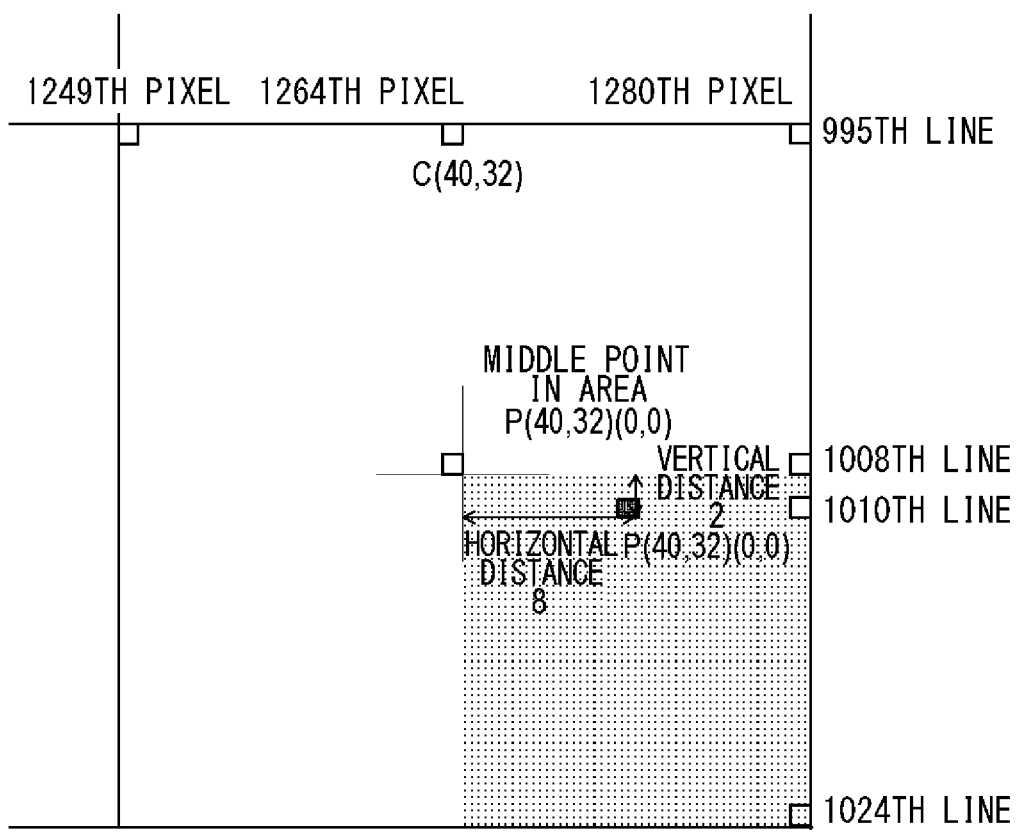
FIG. 7 shows a horizontal distance and a vertical distance of a pixel relative to the center of an area.

FIGS. 5 through 7 show a horizontal distance and a vertical distance of a pixel relative to the center of an area.

A general calculation to determine an area number and distances from the center of the area based on the horizontal and vertical pixel positions will be explained. Both horizontally and vertically, the area number is determined by adding 16, which is ½ the area size, to the pixel position/line number and dividing the result by 32, and the remainder from the division represents a distance from the center of the area. For example, for the pixel at the 312nd position horizontally and on the 100th line vertically, 312+16=32*10+8, 100+16=32*3+20. Therefore, the horizontal area number x is 10, the vertical area number y is 3, the horizontal distance h from the center of the area is 8, and the vertical distance v is 20. In other words, the point at the 312nd position horizontally and on the 100th line vertically is denoted by P(10,3) (8,20).

The post-interpolation area-by-area detected saturation value at the point P(10,3) (8,20) will be H(10,3) (8,20), which is calculated by adding the area-by-area detected saturation value C(10,3) of the area positioned 10th horizontally and 3rd vertically, the area-by-area detected saturation value C(10,4) of the area immediately below, the area-by-area detected saturation value C(11,3) to the right, and the area-by-area detected saturation value C(11,4) to the lower right in accordance with the horizontal distance 8 and the vertical distance 20 as described above.

However, in the case of pixels before the 16th line, and, more specifically, in the case of the pixel on the 6th line and positioned 24th horizontally, for example, computation in the vertical direction results in 6+16=22, which is less than 32 and makes the area number 0, despite the fact that the area number should begin with 1. This is addressed by finding that 22=32−10 and clipping the negative value to 0. Horizontally, 24+16=32+8 so that the pixel is identified as P(1,1) (8,0) (see FIG. 6). A similar process is performed horizontally. Pixels positioned 16th or less horizontally are similarly processed and are identified by a horizontal area number 1 and a horizontal distance 0.

For the 1010th line, 1010+16=1026=32*32+2, but the area-by-area detected saturation value C(x,33) necessary to compute H(x,32) (h,2) is not available. In this case, the problem is avoided by defining the vertical distance to be 0 and assuming that a factor of 0 is multiplied by C(x,33) (see FIG. 7). A similar process is performed horizontally. The horizontal distance is defined to be 0 for pixels with a value 1265 or more, i.e., pixels with a value in excess of 1280 after 16 is added.

The interpolation is performed through the steps described above. Post-interpolation area-by-area detected saturation signals are obtained in values graded from pixel to pixel.

As described above, the image correction device 100 according to the embodiment corrects pixel values by mixing the 2.2 gamma output value from the color gamma processing unit 12 and the GSDF output value from the GSDF processing unit 14 at a mixing ratio obtained from the saturation value K. The maximum of the saturation value K is 512 so that the mixing ratio of the 2.2 gamma output value and the GSDF output value is adjusted in 512 grades. Instead of making a binary discrimination between color and monochrome, the saturation is weighted in 512 grades of color and monochrome. Signals subjected to gamma curve processes including both the 2.2 gamma process and the GSDF process are mixed in accordance with a result of determination on a pixel by pixel basis, at a proportion determined by color discrimination. In other words, the higher the score of determination of color, the closer the whole process to the 2.2 gamma process. The higher the score of determination of monochrome, the closer the whole process to the GSDF process. In this way, an unnatural step is prevented from being produced at a boundary between a color image area and a monochrome image area.

Further, by using the larger of the pixel-by-pixel saturation value from the limiter 22 and the area-by-area saturation value from the area-by-area detection processing unit 30 to determine the saturation value K, a false determination of a color/monochrome area is avoided. Even if a thinly colored portion or a monochrome portion is found in an area with a high proportion of color, an area-based determination is prioritized so that it is possible to avoid a false determination of determining such a portion as a monochrome area. Thus, by adding results of detecting pixel-by-pixel saturation values in units of areas so as to produce an area-by-area detected saturation value and by synthesizing the value with the results of detecting pixel-by-pixel saturation values, precision of detection is improved. Further, by using area-by-area detected saturation values that are interpolated so that transition is smoothed and a boundary between areas is less noticeable in making a determination area by area, an unnatural step is prevented from being produced at a boundary between areas.

According to the embodiment, it is also possible to detect lines drawn in a monochrome image (CAD, scale, etc.) or a color image of a small area (elastography, color Doppler, etc.) by performing a detection on a pixel by pixel basis. A completely pixel-by-pixel detection according to the related art may amplify variation in the brightness signal, creating distortion in gradation in a thinly colored portion in a color image. Improvements are made by using area-by-area detection in combination. By weighting results of discrimination instead of binarizing them, failure in color/monochrome discrimination in an image is prevented from occurring in a simplified correction process of combining pixel-by-pixel detection with area-by-area detection.

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. An image correction device comprising:
    a color gamma processing unit that subjects an input image to gamma correction for color on a pixel by pixel basis;
    a monochrome gamma processing unit that subjects the input image to gamma correction for monochrome on a pixel by pixel basis; and
    a mixer that mixes a gamma corrected value for color provided by the color gamma processing unit with a gamma corrected value for monochrome provided by the monochrome gamma processing unit at a mixing ratio based on a pixel-by-pixel saturation value of the input image, and outputs a gamma corrected value of a pixel in the input image.

2. The image correction device according to claim 1, further comprising:
    an area-by-area detection processing unit that detects a saturation value on an area by area basis; and
    a selector that selects one of the pixel-by-pixel saturation value of the input image and an area-by-area saturation value of the input image detected by the area-by-area detection processing unit, wherein
    the mixer mixes the gamma corrected value for color provided by the color gamma processing unit with the gamma corrected value for monochrome provided by the monochrome gamma processing unit at a mixing ratio based on the saturation value selected by the selector.

3. The image correction device according to claim 2, wherein
    the selector selects the larger of the pixel-by-pixel saturation value of the input image and the area-by-area saturation value of the input image detected by the area-by-area detection processing unit.

4. The image correction device according to claim 2, wherein
    the area-by-area detection processing unit includes an interpolator that determines a saturation value of a pixel in an area by interpolating a saturation value detected in units of areas by using a saturation value of an adjacent area.

5. An image correction method comprising:
    subjecting an input image to gamma correction for color on a pixel by pixel basis;
    subjecting the input image to gamma correction for monochrome on a pixel by pixel basis; and
    mixing a gamma corrected value for color provided by said gamma correction for color with a gamma corrected value for monochrome provided by said gamma correction for monochrome at a mixing ratio based on a pixel-by-pixel saturation value of the input image, and outputs a gamma corrected value of a pixel in the input image.

6. A recording medium having embedded thereon an image correction program comprising:
    a color gamma processing module that subjects an input image to gamma correction for color on a pixel by pixel basis;
    a monochrome gamma processing module that subjects the input image to gamma correction for monochrome on a pixel by pixel basis; and
    mixing a gamma corrected value for color provided by said color gamma processing module with a gamma corrected value for monochrome provided by said monochrome gamma processing module at a mixing ratio based on a pixel-by-pixel saturation value of the input image, and outputting a gamma corrected value of a pixel in the input image.

* * * * *